Aug. 7, 1962  S. P. SIRIANNI  3,048,148
BALL POINT PEN
Filed March 18, 1959
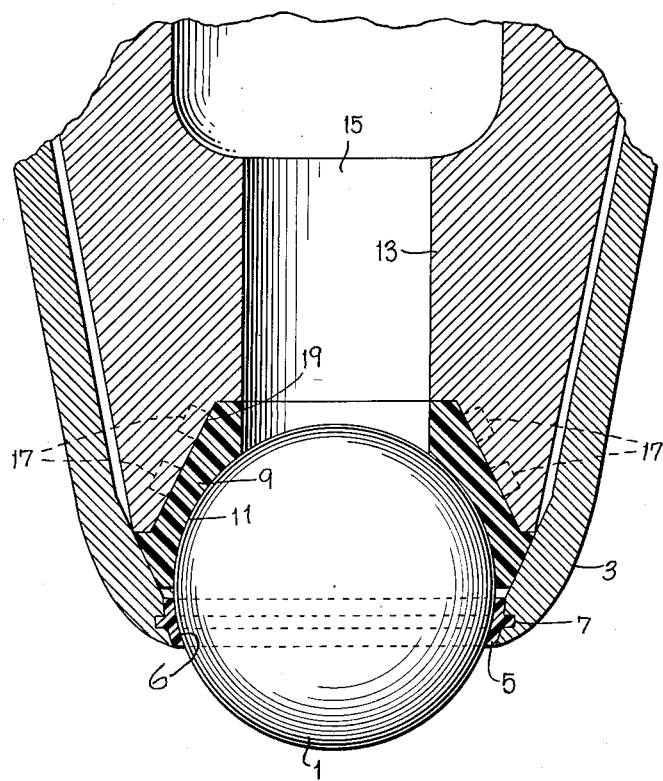
INVENTOR.
SALVATORE P. SIRIANNI
BY Robert S. Dunham
ATTORNEY 3,048,148
BALL POINT PEN
Salvatore P. Sirianni, 408 W. 54th St., New York 19, N.Y.
Filed Mar. 18, 1959, Ser. No. 800,124
4 Claims. (Cl. 120—42.4)

This invention relates to a ball point writing instrument and more especially to a ball point pen in which the writing fluid or ink is contained within a barrel or housing forming the body of the pen. The invention particularly relates to the means for supporting a ball at the end of the barrel.

In general in a ball point pen a member carried at one end of the barrel provides a socket having an inner concave surface which usually is a portion of a sphere for engagement with the spherical surface of the ball. A part of this surface of the socket is disposed outwardly sufficiently beyond the diameter of the ball transverse to the length of the barrel so that the ball is retained in its operative position with the surface thereof in bearing relation to the surface of the socket but with tolerance to permit the ball to rotate on its center with its surface in sliding relation to the socket surface when the ball is in rolling engagement with the writing surface or paper. In all such ball pen constructions the problem arises of holding the ball in its proper position for the rotation referred to with sufficient bearing surface in the socket to take the pressure brought thereon when the ball end of the pen is pressed upon the paper, and with as little friction as possible. Moreover, while providing for the requisite rotation of the ball, the clearance between the ball and the surface of the socket must be sufficient, or other provision must be made, so that the ink reaching the ball from the reservoir within the housing may be carried around on the ball to the position where the ink is exposed and will come in contact with the surface of the paper.

Due to the fact that the size of the ball is very small, in many cases only a few hundredths of an inch, the unit pressure brought upon the surface of the socket may be considerable. The friction developed, therefore, may be considerable and various expedients have been adopted to limit the amount of unit pressure and the amount of friction which prevent satisfactory rotation of the ball. In order to meet the problem of carrying the ink between the ball surface and the spherical socket surface so as to reach the paper, the surface of the socket has been subdivided or other means adopted to provide flow channels for the ink, as well as to provide balls with recessed or etched surfaces in which the ink is carried in the rotation of the ball. In some cases a porous ball has been provided through the pores of which the ink is intended to flow and to be withdrawn at the surface of the paper in the writing movement. The proposals heretofore made for meeting these problems have not been entirely satisfactory to prevent slipping and to afford easy writing action.

It is an object of the invention to provide a socket construction for a ball pen which will secure easy rotation of the ball in the socket and easy rolling action of the ball on the writing surface.

It is another object of the invention to limit the friction between the ball and the socket surface in order to provide for easier rolling action.

It is a further object of the invention to provide a ball pen construction which will require less pressure on the writing surface for continuous application of the ink to the paper.

It is a still further object of the invention to provide a ball point pen construction in which the unit pressure on the bearing surface will be restricted while providing for free movement of the ink carried by the ball.

The objects of the invention are secured by providing a body in which the socket is formed and made of a material which is non-absorbent and chemically inert and which provides a hard, smooth bearing surface of low coefficient of friction and which has a substantially non-adhesive characteristic. As the material is chemically inert and non-absorbent the ink ordinarily used in ball point pens have no deleterious effect upon this material to change its chemical condition or to alter its hardness and its low coefficient of friction. Moreover, as the surface has a characteristic such that materials, including the ink, will not readily adhere thereto, the ink carried by the ball in its rotative movement is not held back by the adhesion of the ink to the bearing surface. Since the ball is easily rotatable because of the low coefficient of friction, this ink is readily carried forward to the exposed position for contact with the writing surface.

The ball of the pen of the invention may be of steel or other metal or material which is suitable for carrying the ink and which will retain the spherical shape of the ball and will not wear unduly to develop change in the spherical contour of the ball. The ball may be made in accordance with suggestions in the prior art with an etched surface or one having concavities, or may be porous. It also may be made of corrosion and wear resistant alloys or may be plated to resist corrosion and wear.

It has been found in accordance with the invention that the material for the socket which will provide the non-absorbent, chemically inert characteristics as well as providing a hard, smooth, low friction bearing surface, may be a plastic comprising a perhalogenated polyethylene in which at least one of the halogen atoms is fluorine. Such a material may be a fluorocarbon selected from the group comprising a polymer of tetrafluoroethylene and a polymer of trifluorochloroethylene. Commercial materials having the characteristics which have been mentioned above include "Teflon" and "Kel–F." Preferably, the plastic utilized for the socket material of the invention is a polymerized tetrafluoroethylene resin which may have a static coefficient of friction equal to or less than the kinetic coefficient. This coefficient may be less than .090 and preferably substantially in the range between 0.16 and .040. This material has an adhesion characteristic such that there is little or no adhesion of other materials thereto, so that the ink is substantially non-adhesive to the bearing surface. The hardness test of this material may be in the range between D50 and D60 by the durometer test. This material has a low coefficient of thermal expansion and a low percentage of deformation under load, 4–8% at 122° F.–1200 lbs. per sq. inch in 24 hours. The water absorption characteristic is generally less than one hundredth percent by ASTM test.

The invention is more particularly described in connection with the drawing which shows a longitudinal section of the end portion of a ball point pen embodying the invention.

In the drawing the ball 1 is retained in position by a ferrule 3 which may be secured to the barrel of the pen, not shown, in any suitable manner. This ferrule extends about the axis of the barrel and carries a lining 5 at the portion thereof which is adjacent the ball surface. The lining 5 may be secured to the inner annular surface of the ferrule 3 by portions of the lining entering an annular groove 7 formed in the annular surface of the ferrule. The application of the lining 5 may be accomplished by pressing the material of the lining into the annular groove 7, thus providing a mechanical fastening for the lining 5. As the material used for the lining has a non-adhesive characteristic which has been referred to above, such mechanical means or other means for holding the lining in place is desirable or may be necessary depending upon the form of the ferrule 3 and its annular surface and other constructive features of the pen. It will be noted, in accordance with usual practice, that the plane of the annular lining 5 is disposed outwardly with respect to the center of the ball so as to hold this ball against outward movement thereof with respect to the ferrule and the barrel of the pen.

In accordance with the invention the socket in the embodiment being described may be provided by an annular bearing member or bushing 9 which also is formed of the material above referred to which provides the hard, non-porous, low-friction surface 11 engaging the surface of the ball 1. The diameter of the surface 11 of spherical contour is only slightly larger than the diameter of the ball 1, this difference in diameter being merely sufficient to carry the film of ink on the ball surface to the exposed position for contact with the writing surface. The bearing member 9 may be held in a support member 13 which is carried by the barrel, the member 13 providing a central space 15 in which the ink from the reservoir may flow into engagement with the ball 1.

Various conventional constructions may be used for the barrel and the reservoir which will provide for flow of the ink to the surface of the ball through the space 15 in such quantity that the ball surface will carry the ink past the surface 11 of the member 9 and between the ball surface and the inner surface 6 of the annular lining member 5 to the exposed area for contact with the writing surface, substantially without removal of the ink from the ball by the friction of the socket. Moreover, because of the non-adhesive characteristic of the material of the member 9, little or no ink is retained on this surface so that it does not dry thereon, tending to interfere with rotation of the ball and with the movement of the ink to the exposed position on the ball. The low friction characteristic, therefore, is maintained and the ball easily rolls on the writing surface. Because of this low friction characteristic, moreover, the surface 11 provided by the member 9 may be of substantial extent in order that the unit bearing pressure may be limited.

As shown in the drawing, recesses 17 may be formed in the support member 13 at the annular surface 19 thereof for mechanically retaining the bearing member or bushing 9 in position. Within the scope of the invention, however, when the preferred material polytetrafluoroethylene resin is utilized, the lining 5 and the bearing member 9 may be applied as a coating to the parts 3 and 13. When these parts are made of metal, as shown, special techniques which are known to the manufacturers of polytetrafluoroethylene resins may be used. It is possible in some cases also to utilize conventional adhesives for securing the lining 5 and the bearing member 9 in place, or the combination of the mechanical means and the adhesives may be utilized. Moreover, within the scope of the invention the member 13 throughout its extent may be formed of the plastic which it is proposed to use in accordance with this invention to provide a hard, smooth, low friction bearing surface and a material which is non-absorbent and chemically inert, in order to obtain the advantages which have been referred to. When this material is applied as a coating it may be applied to the surface of the member 13 which defines the central space 15 to prevent the ink from adhering to this surface and to assist the flow of the ink.

In the use of polytetrafluoroethylene resin for the bearing material it has been found that in some cases a film of the resin becomes transferred to the moving member from the bearing surface. This condition is not detrimental to the device of the invention because, while the ink may not adhere as well to the ball, it does not adhere to the plastic bearing member and, therefore, is free to move downwardly between the bearing member and the ball until it reaches the lining 5 which may, as in some conventional devices, act as a doctor to determine the thickness of the film passing between this lining and the ball and carried on the ball surface for application to the writing surface.

The provision of the bearing socket having the characteristics described makes possible a pen which writes easily without skipping and without undue pressure on the paper and which is long lasting because of the reduction of wear due to friction. It will be understood that pens of different form from that shown in the drawing may be provided with the bearing socket or lining of the invention utilizing material of the character described. Within the scope of the invention the ferrule lining 5 and the bearing member 9 may be combined in one piece which, for example, may be molded about the ball and inserted with the ball as a unit into engagement with a supporting member carried by the barrel of the pen.

When the material having the above described properties is to be applied as a coating to a supporting part it may be prepared as an aqueous dispersion into which in some cases the part to be coated may be dipped. Other methods of coating the supporting part, such as the ferrule 3 and the member 13, may be used in accordance with specifications of the manufacturer of the particular fluorocarbon plastic utilized.

These and other modifications of the form and of the method of applying the socket material may be made within the scope of the invention as defined in the appended claims.

I claim:

1. A ball point pen comprising means providing a socket, and a ball disposed in said socket for rotation of said ball in said socket when in rolling contact with a writing surface, at least a portion of said socket means being formed of a plastic comprising a perhalogenated polyethylene in which at least one of the halogen atoms is fluorine and providing a surface for slipping engagement with the surface of said ball in said socket in said rolling movement of said ball on said writing surface, said surface of said plastic being substantially non-adhesive to the ink so that the ink is carried on the surface of the ball substantially without adhering to said surface of said socket.

2. A ball point pen comprising means providing a socket, and a ball disposed in said socket for rotation of said ball in said socket when in rolling contact with a writing surface, said socket means being form of a plastic comprising a fluorocarbon from the group consisting of a polymer of tetrafluoroethylene and a polymer of trifluorochloroethylene and providing a surface for slipping engagement with the surface of said ball in said socket in said rolling movement of said ball on said writing surface, said surface of said plastic being substantially non-adhesive to the ink so that the ink is carried on the surface of the ball substantially without adhering to said surface of said socket.

3. A ball point pen comprising means providing a socket, and a ball disposed in said socket for rotation of said ball in said socket when in rolling contact with a writing surface, said socket means being formed of a plastic comprising a polymerized tetrafluoroethylene and providing a surface for slipping engagement with the surface of said ball in said socket in said rolling movement of said ball on said writing surface, said surface of said plastic being substantially non-adhesive to the ink so that the ink is carried on the surface of the ball substantially without adhering to said surface of said socket.

4. In a ball point pen having means providing a socket, and a ball supported in said socket for rotation of said ball in said socket when in rolling contact with a writing surface, the combination with said socket means of a lining carried by said socket means and formed of a plastic comprising a perhalogenated polyethylene in which at least one of the halogen atoms is fluorine, said lining providing a surface for slipping engagement with the surface of said ball in said rolling movement of said ball on said writing surface, said plastic at said surface being substantially non-adhesive to the ink so that the ink is carried on the surface of the ball without adhering to the surface of said socket.

References Cited in the file of this patent

UNITED STATES PATENTS

| | | |
|---|---|---|
| 2,700,784 | De Brock | Feb. 1, 1955 |
| 2,749,566 | Thomas | June 12, 1956 |
| 2,777,783 | Welch | Jan. 15, 1957 |
| 2,979,030 | Harrington | Apr. 11, 1961 |

FOREIGN PATENTS

| | | |
|---|---|---|
| 1,108,400 | France | Jan. 12, 1956 |
| 795,242 | Great Britain | May 21, 1958 |

OTHER REFERENCES

Du Pont News—No. 6; 1954—Bearings of Du Pont Teflon, Dr. W. B. Happoldt—Automotive Industries—pgs. 107–108.

SPE Journal—April 1955—The Sliding Friction of Teflon, J. B. Thompson et al., pgs. 13–14 and 38.

Polyethylene—edited by A. Renfrew and P. Morgan; pub. in 1957 by Adlard & Sons Ltd., in Croydon, Surrey, Eng.; Sec. 10, "Chemical Properties," page 199.